US009356695B2

(12) United States Patent
DiPoala

(10) Patent No.: US 9,356,695 B2
(45) Date of Patent: May 31, 2016

(54) AUTOMATICALLY ALIGNING PHOTOBEAM ARRANGEMENT

(75) Inventor: William DiPoala, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 1990 days.

(21) Appl. No.: 12/411,689

(22) Filed: Mar. 26, 2009

(65) Prior Publication Data

US 2010/0247106 A1 Sep. 30, 2010

(51) Int. Cl.
*H04B 10/00* (2013.01)
*H04B 10/112* (2013.01)
*H04B 10/114* (2013.01)

(52) U.S. Cl.
CPC ........ *H04B 10/1127* (2013.01); *H04B 10/1143* (2013.01)

(58) Field of Classification Search
CPC .... H04B 10/1125; H04B 10/11; H04B 10/40; H04B 10/118
USPC ........................... 398/129–131, 122, 128, 135
See application file for complete search history.

(56) References Cited

U.S. PATENT DOCUMENTS

| 6,285,017 B1 | 9/2001 | Brickell | |
|---|---|---|---|
| 6,323,980 B1 * | 11/2001 | Bloom | 398/129 |
| 6,489,603 B1 | 12/2002 | Giovannardi | |
| 7,071,452 B2 | 7/2006 | Warner et al. | |
| 7,230,964 B2 | 6/2007 | Das et al. | |
| 7,259,662 B2 | 8/2007 | Lewis | |
| 7,352,944 B2 | 4/2008 | Yang | |
| 2002/0012139 A1 * | 1/2002 | Willebrand et al. | 359/118 |
| 2004/0149939 A1 * | 8/2004 | Dickson et al. | 250/559.12 |
| 2007/0133931 A1 | 6/2007 | Lee et al. | |
| 2008/0043237 A1 | 2/2008 | Grimm et al. | |

* cited by examiner

*Primary Examiner* — Dawayne A Pinkney
(74) *Attorney, Agent, or Firm* — Michael Best & Friedrich LLP

(57) ABSTRACT

A method of aligning an optical beam includes transmitting a first beam from a first optical transceiver to a second optical transceiver. A position of the second optical transceiver is adjusted based upon the received first beam. A second beam is transmitted from the second optical transceiver to the first optical transceiver. A command signal is transmitted from the second optical transceiver to the first optical transceiver. In response to the command signal, a position of the first optical transceiver is adjusted based upon the received second beam.

3 Claims, 7 Drawing Sheets

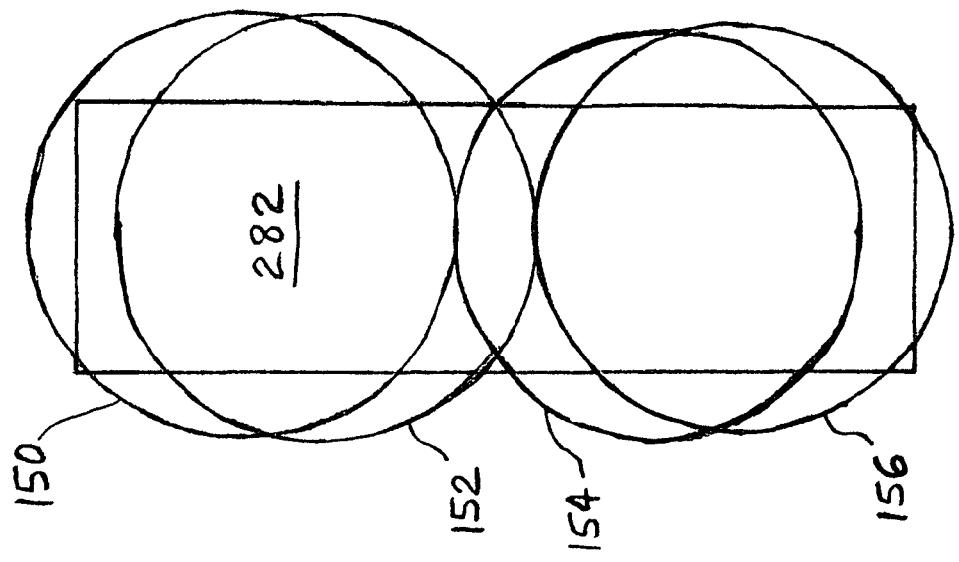
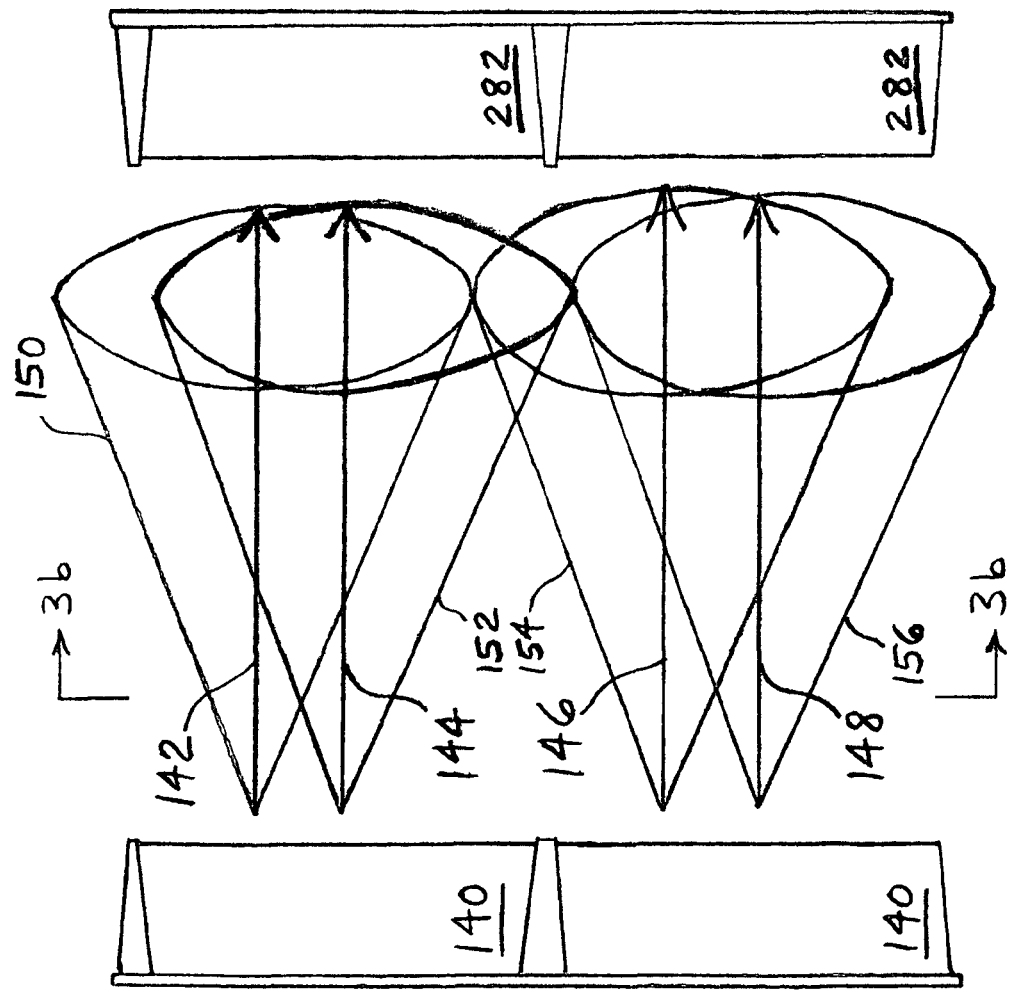
FIG. 3b
FIG. 3a

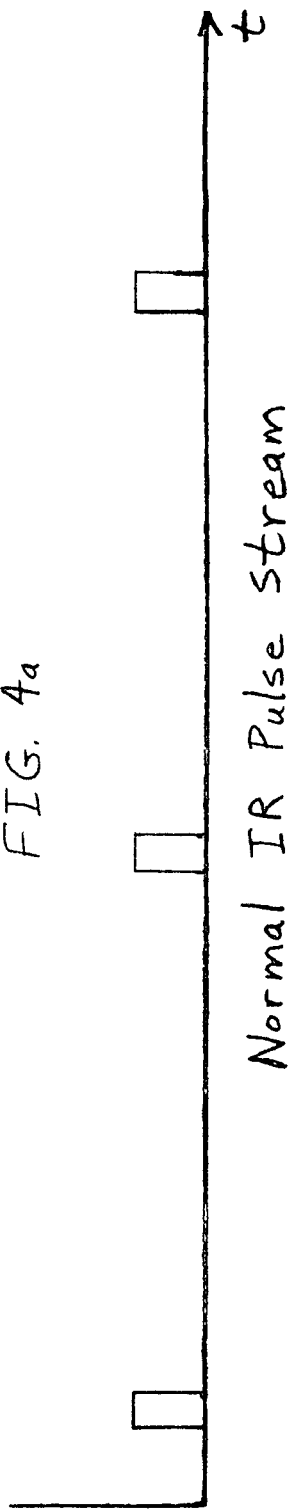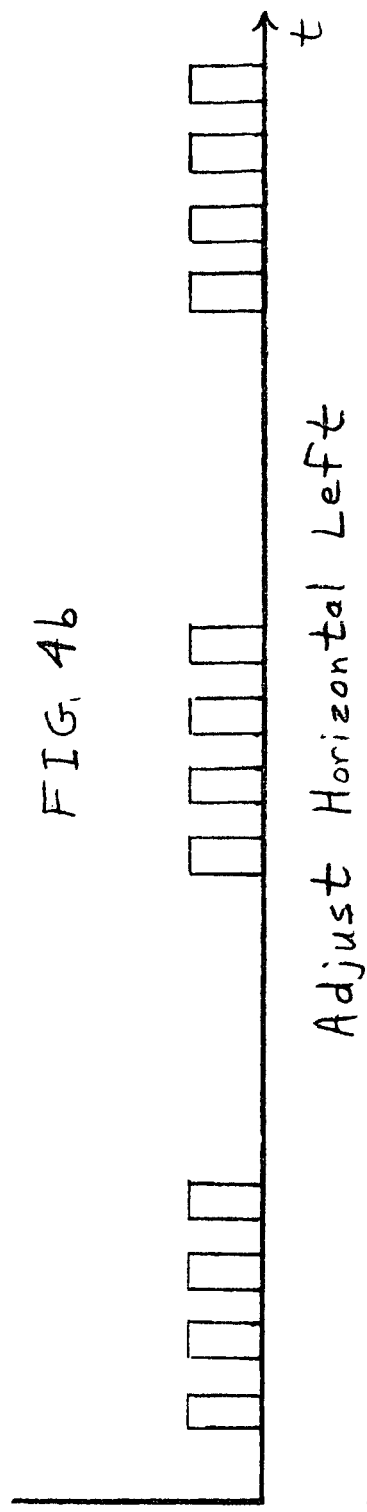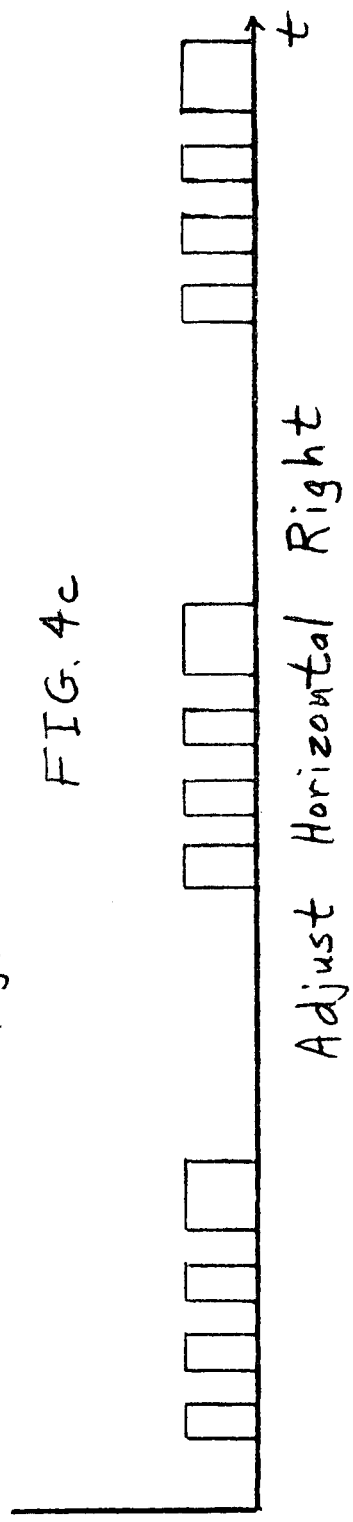

AUTOMATICALLY ALIGNING PHOTOBEAM ARRANGEMENT

BACKGROUND OF THE INVENTION

1. Field of the Invention

The present invention relates to a photoelectric beam system, and, more particularly, to an alignment apparatus for a photoelectric beam system.

2. Description of the Related Art.

Photoelectric beam emitters and their sensors are used for measurement and control operations in which the photoelectric beams are broken or restored between the emitters and the sensors. The photoelectric beam arrangement may be used for counting items along a conveyor belt, measuring the size of objects, detecting the position of a machine part, and many other applications.

One type of photoelectric beam arrangement includes an emitter and a receiver in the same housing. Two separate housings, each including an emitter and a receiver, are positioned on opposite sides of an object's path. The photoelectric beam is transmitted from the emitter to the detector across the path.

In these photoelectric systems, accurate alignment of the housings and, consequently, the optical path must be achieved for proper operation. It is important that the optical system be properly aligned in order to maximize the signal-to-noise ratio. If the system has a poor signal-to-noise ratio, then the system may be susceptible to false alarms caused by environmental conditions such as rain, fog, snow and frost.

One of the problems associated with current alignment methods is that it requires two people to align the photoelectric beams. Known photobeam assemblies incorporate vertical and horizontal alignment controls. The controls are adjusted manually by the installer using a screw adjustment. A signal level output is usually provided for connection to a hand held voltmeter. Adjustments are made to obtain the largest signal levels possible. The signal level measurements are provided at only the receive end of the system. Optimizing the alignment of the transmitter requires a second person. The transmitter and receiver may be 300 feet apart, and thus, even with two people, they may still be difficult to align.

Another problem is that the mounting surface on which the housings are mounted can shift over time, thereby causing a misalignment. In this case, two people must return to the scene in order to correct the misalignment.

What is neither disclosed nor suggested in the prior art is a method of aligning an optical beam that does not require two people, and that involves transmitting two different photobeams in opposite directions between a master unit and a slave unit, adjusting the position of the master unit to align it with the beam from the slave unit, and then adjusting the position of the slave unit to align it with the beam from the master unit.

SUMMARY OF THE INVENTION

The present invention is directed to a photo electric beam incorporating an auto adjustment system. A motorized system automatically aligns on the initial installation and self corrects on a regular time interval to optimum performance. The self correction adjustment may be performed when the signal level falls below a percentage of the peak level achieved during the initial system alignment. A transmitter and receiver are included at each end of the photobeam system. This provides an infrared (IR) communication path between each end. The communication paths may be needed for the auto alignment function. The IR light signal is normally pulsed in order to conserve energy and power requirements and to allow higher peak light levels. The pulse rate may be at a steady frequency, such as 1 KHz in one embodiment. An eight-bit digital word may be used for the control commands.

The system alignment process may include the two devices being manually and visually aimed towards each other. This may be advantageous to provide the auto alignment system with some baseline signal to start with. A button may be pressed on the master unit to initialize the auto alignment procedure. The master unit may adjust its vertical position up/down and then its horizontal position left/right to find the peak signal level position. The master unit may then send an IR command signal to the slave unit to start its adjustment procedure. Lastly, the slave unit may adjust its vertical position up/down and then its horizontal position left/right to find the peak signal level position.

The invention comprises, in one form thereof, a method of aligning an optical beam, including transmitting a first beam from a first optical transceiver to a second optical transceiver. A position of the second optical transceiver is adjusted based upon the received first beam. A second beam is transmitted from the second optical transceiver to the first optical transceiver. A command signal is transmitted from the second optical transceiver to the first optical transceiver. In response to the command signal, a position of the first optical transceiver is adjusted based upon the received second beam.

The invention comprises, in another form thereof, a method of providing an aligned optical beam, including providing a first optical device having a first housing with a first optical transmitter and a first optical receiver. A second optical device is provided including a second housing having a second optical transmitter and a second optical receiver. The first and second optical devices are placed on opposite sides of a space to be monitored. The first and second housings are oriented such that the first transmitter is aimed at the second receiver, and such that the second transmitter is aimed at the first receiver. A first beam is transmitted from the first transmitter to the second receiver. A position of the second receiver is adjusted to optimize a quality of the received first beam. A second beam is transmitted from the second transmitter to the first receiver. A command signal is transmitted from the second transmitter to the first receiver. In response to the command signal, a position of the first receiver is adjusted to optimize a quality of the received second beam.

The invention comprises, in yet another form thereof, a method of providing an aligned optical beam, including providing a first optical device having a first optical transmitter and a first optical receiver. A second optical device is provided including a second optical transmitter and a second optical receiver. The first and second optical devices are placed on opposite sides of a space to be monitored. The first and second optical devices are manually oriented such that the first transmitter is aimed in a general direction of the second receiver, and such that the second transmitter is aimed in a general direction of the first receiver. A first signal is transmitted from the first transmitter to the second receiver. The first transmitter or the second receiver is adjusted to maximize a signal strength of the received first signal. A second signal is transmitted from the second transmitter to the first receiver. A control device on the first optical device or the second optical device is manually activated. In response to the manual activation of the control device, a command signal is transmitted from the first transmitter or the second transmitter. In response to the command signal, the first receiver or the second transmitter is adjusted to maximize a signal strength of the received second signal.

An advantage of the present invention is that a single person may operate the photobeam alignment arrangement.

Another advantage is that the fine positioning of the optical devices is performed automatically.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3a is a side view illustrating the range of photobeams transmitted from one embodiment of a transmitter to one embodiment of a receiver of the arrangement of FIGS. 1 and 2.

FIG. 3b is a view along line 3b-3b of FIG. 3a illustrating the range of photobeams transmitted from one embodiment of a transmitter to one embodiment of a receiver of the arrangement of FIGS. 1 and 2.

FIG. 4a is a plot of an infrared pulse stream that may be transmitted from the transmitter to the receiver of the arrangement of FIG. 3a.

FIG. 4b is a plot of an infrared digital command signal that may be transmitted from the transmitter to the receiver of the arrangement of FIG. 3a.

FIG. 4c is a plot of another infrared digital command signal that may be transmitted from the transmitter to the receiver of the arrangement of FIG. 3a.

Figure 1:
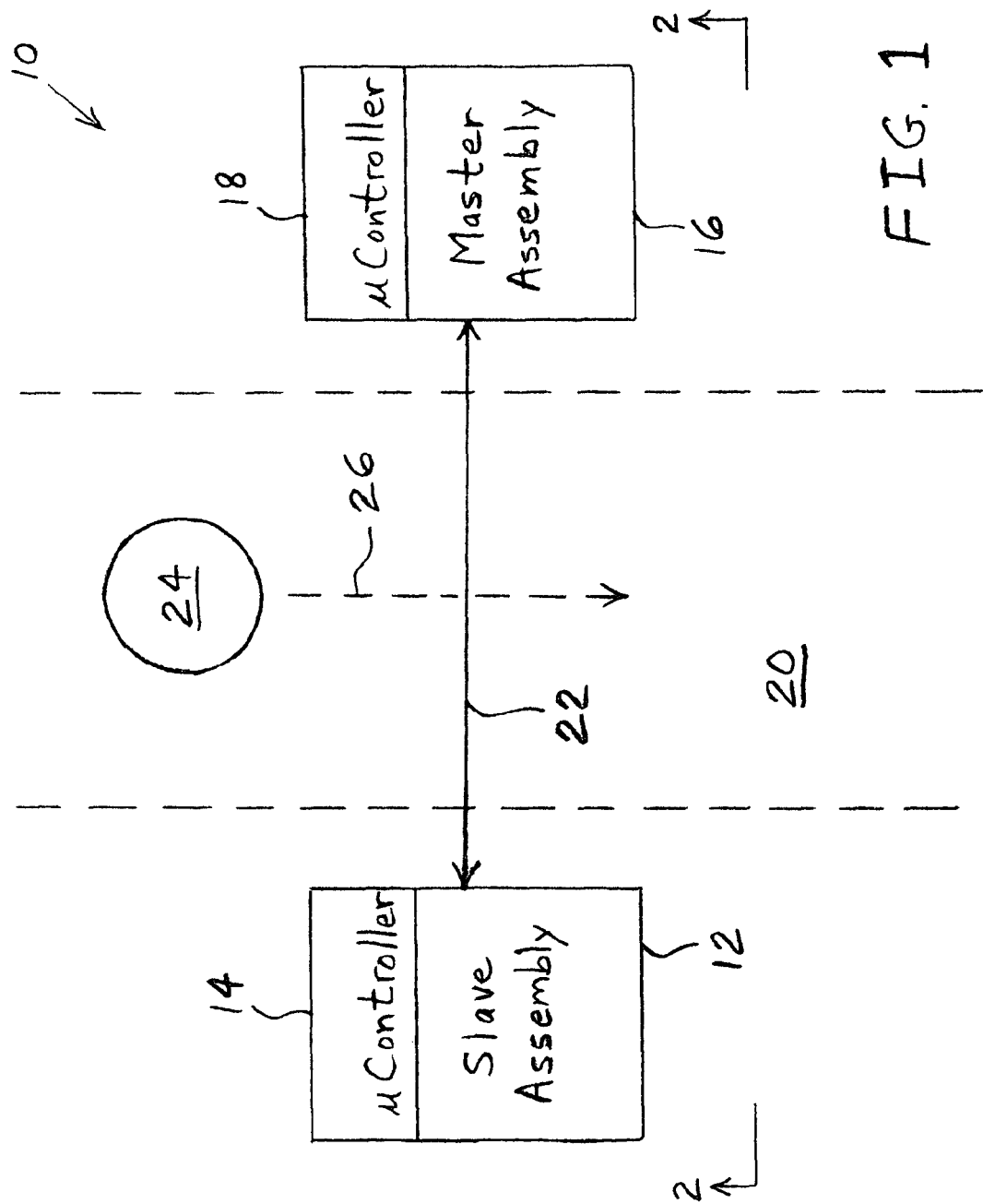
FIG. 1 is a plan view of one embodiment of an automatically aligning photobeam arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings and particularly to FIG. 1, there is shown one embodiment of an automatically aligning photobeam arrangement 10 of the present invention, including a slave photobeam assembly 12 having a microcontroller 14, and a master photobeam assembly 16 having a microcontroller 18. Master assembly 16 may transmit commands to slave assembly 12, which slave assembly 12 complies with. Master assembly 16 and slave assembly 12 may be disposed on opposite sides of a space to be monitored, such as a hallway 20 of a building. Master assembly 16 and slave assembly 12 may conjointly monitor hallway 20 by transmitting and receiving photobeams, i.e., light energy, in at least one of the directions indicated by double arrow 22. More particularly, master assembly 16 and slave assembly 12 may detect when one or more photobeams transmitted between master assembly 16 and slave assembly 12 are interrupted, such as by an object 24 moving into the path of the photobeam (s), as indicated by arrow 26. That is, microcontrollers 14, 18 may ascertain when a receiver of slave assembly 12 stops receiving a beam from a transmitter of master assembly 16, and/or when a receiver of master assembly 16 stops receiving a beam from a transmitter of slave assembly 12. In one application, arrangement 10 is used in a security system in order to sense the presence of an object 24 in the form of a human intruder.

Figure 2:
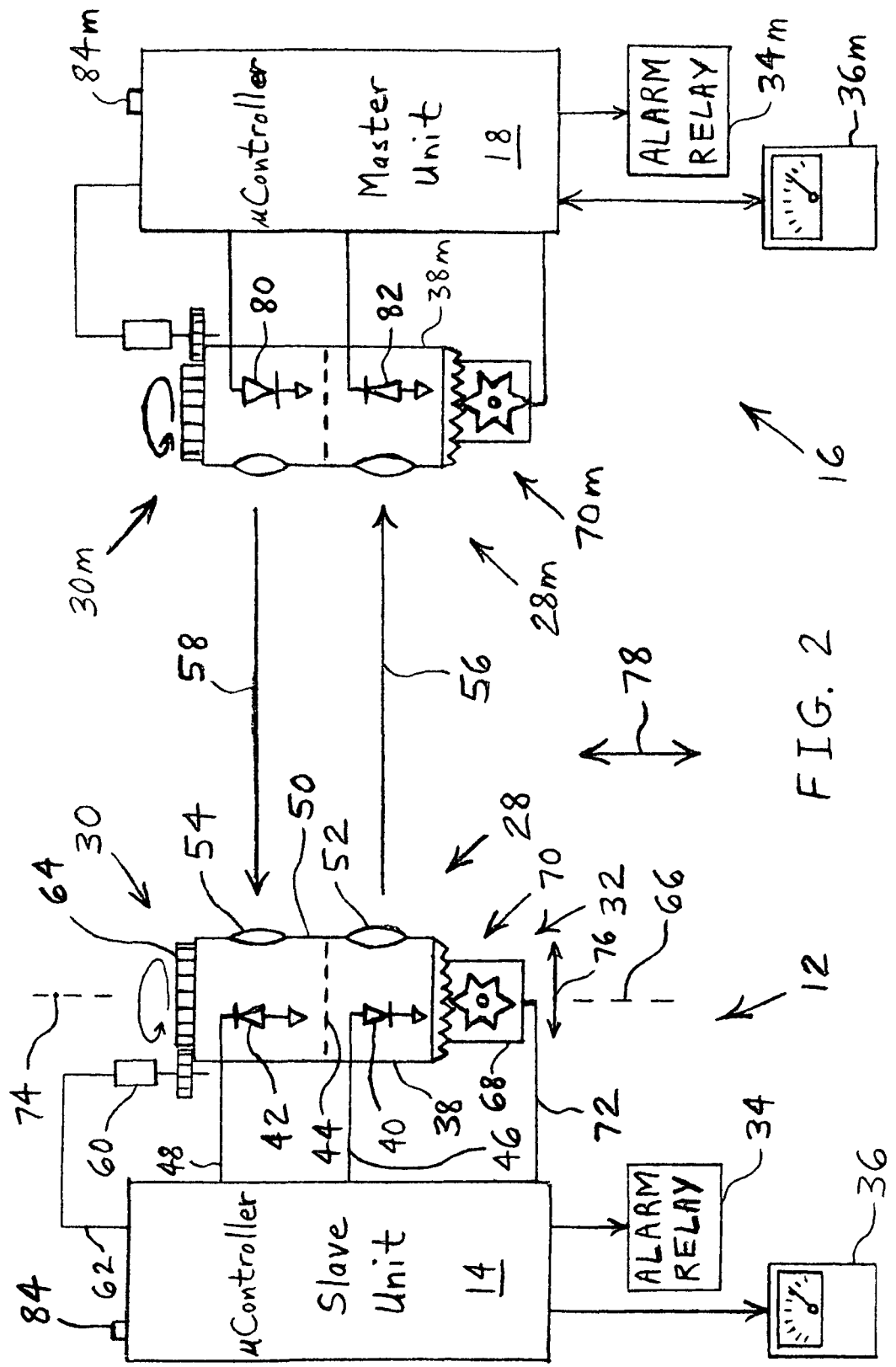
FIG. 2 is a schematic diagram of the arrangement along line 2-2 of FIG. 1.

Slave assembly 12 and master assembly 16 are shown in more detail in FIG. 2. Slave assembly 12 includes, in addition to microcontroller 14, a photo-optical device 28, a horizontal actuator assembly 30, a vertical actuator assembly 32, an alarm relay 34, and a signal level meter 36. Photo-optical device 28 includes an opaque housing 38 containing an LED transmitter 40 of infrared (IR) energy, a receiver 42 of infrared energy, and an opaque optical barrier 44 for preventing IR energy from transmitter 40 from reaching receiver 42. The operation of transmitter 40 may be controlled by microcontroller 14 via a conductor 46. Similarly, receiver 42 is connected to microcontroller 14 via a conductor 48 such that microcontroller 14 can apply voltage to receiver 42 and sense when receiver 42 is receiving optical energy, as indicated by the changing current draw of receiver 42.

Housing 38 may be integral, i.e., monolithic or one-piece, and may retain a lens system 50 including a transmitter lens 52 and a receiver lens 54. Transmitter lens 52 may allow optical energy from transmitter 40 to be emitted beyond housing 38, as indicated at 56; and receiver lens 54 may allow optical energy originating from outside housing 38 to reach receiver 42, as indicated at 58. Lens system 50 may be integral, i.e., monolithic or one-piece, such that lenses 52, 54 are formed of a single continuous piece of optical material.

Horizontal actuator assembly 30 includes a motor 60 drivingly coupled to a gear mechanism 64. Microcontroller 14 may apply either positive or negative voltage to motor 60 via a conductor 62 to thereby actuate gear mechanism 64 to selectively rotate photo-optical device 28 in either a clockwise or counterclockwise direction about a longitudinal axis 66 of device 28. Alternatively, horizontal actuator assembly 30 may be configured to selectively shift photo-optical device 28 in either of two horizontal directions into and out of the page of FIG. 2.

Vertical actuator assembly 32 includes a motor 68 drivingly coupled to a gear mechanism 70. Microcontroller 14 may apply either positive or negative voltage to motor 68 via a conductor 72 to thereby actuate gear mechanism 70 to selectively rotate photo-optical device 28 in either a clockwise or counterclockwise direction about an axis oriented into and out of the page of FIG. 2. In a specific embodiment, the axis is located at 74 along axis 66, and photo-optical device 28 rotates about the axis in the directions indicated by arcuate double arrow 76. Thus, the vertical position of photobeam 56 as received at receiver 82, as well as the point on lens 54 along vertical directions 78 at which beam 58 is received, may be adjusted. Alternatively, vertical actuator assembly 32 may be configured to selectively shift photo-optical device 28 in either of two vertical directions indicated by double arrow 78.

Master assembly 16 is substantially similar to slave assembly 12, and thus is not described in detail herein. One distinction between master assembly 16 and slave assembly 12, however, is that an LED transmitter 80 is disposed above receiver 82 in the orientation shown in FIG. 2. Other components of master assembly 16 may be referred to herein with the same reference number of the corresponding component in slave assembly 12, but with the suffix letter "m" after the reference number in order to designate that the component is part of the master assembly.

Although transmitter 40 is illustrated schematically as single LED in FIG. 2, it may be in the form of a quad transmitter 140 (FIG. 3*a*) including a group of four LEDs each emitting a respective one of photobeams 142, 144, 146 and 148. Although photobeams 142, 144, 146, 148 are directed, and may have their peak intensities, along respective linear paths indicated by the arrowheads in FIG. 3*a*, each of photobeams 142, 144, 146, 148 may be dispersed within a respective one of conical spaces 150, 152, 154, 156. Similarly, although receiver 82 is illustrated schematically as single receiver in FIG. 2, it may be in the form of a quad receiver 282 including a group of four optical energy-sensitive diodes each receiving a respective one of photobeams 142, 144, 146 and 148. Transmitter 80 and receiver 42 of FIG. 2 may also be in the form of a quad transmitter and a quad receiver similar to quad transmitter 140 and quad receiver 282.

The infrared photobeams 56, 58 (which may be quad beams as shown in FIGS. 3*a* and 3*b*) may be in digital form whereby the beams may carry information such as commands and data between slave microcontroller 14 and master microcontroller 18. Under default conditions when no information is being carried, the beam may be a stream of pulses transmitted at regular time intervals, as illustrated in FIG. 4*a*. The reception of this normal IR pulse stream by the receiver may indicate that there is no object disposed in the optical path between the transmitter and the receiver. In embodiments in which slave assembly 12 and/or master assembly 16 are battery powered, this pulsing of the IR photobeam (as opposed to transmitting an IR photobeam of continuous strength) may have the advantage of conserving battery life.

In one embodiment, the photobeams carry eight-bit commands from the master unit to the slave unit. However, it is also within the scope of the invention for commands and/or data to be transmitted from the slave unit to the master unit. Examples of eight-bit commands carried by the photobeams are illustrated in FIGS. 4*b* and 4*c*. Specifically, FIG. 4*b* illustrates the eight-bit command 10101010 being transmitted at regular time intervals. In the illustrated embodiment, this 10101010 represents an "Adjust Horizontal Left" command that instructs the receiving unit to activate horizontal actuator assembly 30 to rotate or shift lens system 50 leftward, e.g., in a direction away from the viewer of FIG. 2. Similarly, FIG. 4*c* illustrates the eight-bit command 10101011 being transmitted at regular time intervals. In the illustrated embodiment, this 10101011 represents an "Adjust Horizontal Right" command that instructs the receiving unit to activate horizontal actuator assembly 30 to rotate or shift lens system 50 rightward, e.g., in a direction towards the viewer of FIG. 2. Other commands may include "Adjust Vertical Up", "Adjust Vertical Down", "Start Adjustment Procedure", "Begin Transmitting Normal IR Pulse Steam", and "Stop Transmitting Normal IR Pulse Steam", for example.

In response to receiving a "Start Adjustment Procedure" command, slave assembly 12 may adjust its vertical and horizontal position in order to optimize a quality or qualities of an IR signal that is being continuously received from master assembly 16. For example, slave assembly 12 may adjust its vertical position in order to maximize a signal strength of the IR signal received by receiver 42. Slave assembly 12 may then adjust its horizontal position in order to further maximize a signal strength of the IR signal received by receiver 42. In one embodiment, slave assembly 12 may continue to iteratively adjust its vertical and horizontal positions until the signal strength of the IR signal received by receiver 42 has been fully maximized and no further gains in signal strength are being achieved.

During the above-described adjustment procedure, transmitter 40 may transmit a continuous IR signal to receiver 82 of master assembly 16. Master assembly 16 may thus verify that the position of slave unit housing 38 that maximizes the strength of the signal received by slave unit receiver 42 also maximizes the strength of the signal received by master unit receiver 82 with respect to the position of slave unit housing 38. Because lens system 50 (as well as the lens system of the master assembly) is a one-piece system, the optimal receiving position of receiver lens 54 and receiver 42 is expected to result in the optimal transmitting position of transmitter lens 52 and transmitter 40.

During installation, an installer may physically carry and place slave assembly 12 and master assembly 16 on opposite sides of a space to be monitored, such as hallway 20. The installer may then manually adjust the vertical and rotational positions of housings 38, 38*m* such that the transmitters are each pointed in the general direction of the corresponding receiver in the opposite assembly.

The installer may then press a pushbutton 84*m*, or other type of switch, on master assembly housing 38*m* in order to initialize an automatic alignment procedure for fine tuning the orientations of the transmitters and receivers in the master assembly and the slave assembly. In the automatic alignment procedure, master microcontroller 18 may transmit a command signal to slave microcontroller 14 instructing slave microcontroller 14 to begin transmitting a photobeam back to master assembly 16. Alternatively, the installer may press a pushbutton 84 on slave microcontroller 14 to cause slave microcontroller 14 to begin transmitting a photobeam to master assembly 16.

Upon sensing that receiver 82 is receiving the photobeam from slave unit transmitter 40, master microcontroller 18 may activate vertical gear mechanism 70*m*. Vertical gear mechanism 70*m* may then move housing 38*m* in vertical directions 78 while master microcontroller 18 samples the signal quality of the photobeam received by receiver 82. In order to evaluate the signal quality, master microcontroller 18 may be in two-way communication with one or more signal quality meters, such as signal quality meter 36*m*. Alternatively, or in addition, stand-alone signal quality meters 36, 36*m* may be used by a human installer in order to determine or verify the signal qualities at the optimal horizontal and vertical positions of housings 38, 38*m*.

Upon master microcontroller 18 determining which vertical position results in an optimal signal quality, master microcontroller 18 operates vertical gear mechanism 70*m* to move housing 38*m* to that optimal vertical position.

In one embodiment, master microcontroller 18 samples signal quality while vertical gear mechanism 70*m* moves housing 38*m* throughout a full range of vertical positions. However, in another embodiment, vertical gear mechanism 70*m* limits the vertical movement of housing 38*m* to only a range sufficient to enable the sampling by master microcontroller 18 to identify a vertical position corresponding to a local signal quality maximum. It may then be assumed that the signal qualities at other vertical positions are below the local signal quality maximum.

With housing 38*m* returned to the optimal vertical position, master microcontroller 18 may activate horizontal gear mechanism 30*m*. Horizontal gear mechanism 30*m* may then move or rotate housing 38*m* over a range of horizontal positions while master microcontroller 18 samples the signal quality of the photobeam received by receiver 82. Upon master microcontroller 18 determining which horizontal position results in an optimal signal quality, master microcontroller 18 operates horizontal gear mechanism 30m to move housing 38m to that optimal horizontal position.

In one embodiment, master microcontroller 18 samples signal quality while horizontal gear mechanism 30m moves housing 38m throughout a full range of horizontal positions. However, in another embodiment, horizontal gear mechanism 30m limits the horizontal movement of housing 38m to only a range sufficient to enable the sampling by master microcontroller 18 to identify a horizontal position corresponding to a local signal quality maximum. It may then be assumed that the signal qualities at other horizontal positions are below the local signal quality maximum.

Having completed the initial automatic alignment of master housing 38m, master microcontroller 18 may transmit to slave microcontroller 14, via transmitter 80, a "Start Adjustment Procedure" command, and then master microcontroller 18 may begin transmitting a photobeam to slave assembly 12. Upon receiving the "Start Adjustment Procedure" command and the photobeam via receiver 42, slave assembly 12 may perform vertical and horizontal alignment procedures to optimize the quality of the received photobeam signal. These vertical and horizontal alignment procedures may be substantially similar to those performed by master assembly 16, and thus are not described in detail herein in order to avoid needless repetition.

In one embodiment, after a predetermined amount of time has elapsed after master microcontroller 18 has transmitted the "Start Adjustment Procedure" command, master microcontroller 18 may assume that slave assembly 12 has completed its adjustment procedures and hence master assembly 16 may begin its normal mode of operation. In another embodiment, however, slave microcontroller 14 transmits an "Adjustment Procedure Completed" message to master microcontroller 18 after slave microcontroller 14 has completed its vertical and horizontal alignments. Upon receiving the "Adjustment Procedure Completed" message via transmitter 40 and receiver 82, master assembly 16 may begin its normal mode of operation.

In yet another embodiment, the alignment process continues iteratively after the initial alignment of the master housing 38m and slave housing 38 in order to achieve greater precision in the alignment. More particularly, after a predetermined amount of time has elapsed after master microcontroller 18 has transmitted the "Start Adjustment Procedure" command, or after master microcontroller 18 has received an "Adjustment Procedure Completed" message from slave microcontroller 14, master microcontroller 18 may again perform its vertical and horizontal alignment procedures. In this second round of alignment, however, the range of movement of housing 38m in the vertical and horizontal directions may be more limited, and may be confined to a smaller range around the previously identified optimal vertical and horizontal positions. Master microcontroller 18 may take a greater number of signal quality samples within a smaller range of positions, and thus may determine the optimal vertical and horizontal positions with finer precision.

Upon completing its second round of the alignment procedure, master microcontroller 18 may again transmit to slave microcontroller 14 a "Start Adjustment Procedure" command and may again begin transmitting a photobeam to slave assembly 12. Upon receiving the "Start Adjustment Procedure" command and the photobeam via receiver 42, slave assembly 12 may again perform vertical and horizontal alignment procedures to optimize the quality of the received photobeam signal, but in this second round with a smaller range of vertical and horizontal positions, and with an increased number of signal quality samples being taken within the reduced ranges. Thus, slave microcontroller 14, like master microcontroller 18, may achieve a greater level of precision in its housing alignment. This iterative alignment process may continue for a predetermined number of additional rounds, or additional rounds may be terminated when further gains in alignment precision are no longer being achieved.

The alignment procedures have been described herein with the vertical alignment occurring first and the horizontal alignment occurring second. However, it is to be understood that the order of this sequence is arbitrary, and it is also possible for the horizontal alignment to be performed first and the vertical alignment to be performed second. Further, the alignment need not be performed in strictly vertical and horizontal directions, but rather may be performed along any two directions between and/or including the vertical and horizontal directions.

During operation, one or both of IR photobeams 56, 58 may be continuously transmitted across the monitored space. One or both of slave microcontroller 14 and master microcontroller 18 may periodically verify, perhaps with use of one or both of meters 36, 36m, that a photobeam continues to be received by one or both of receivers 42, 82. In one embodiment, if for some reason a transmitting one of microcontrollers 14 or 18 plans to stop transmitting, then the transmitting microcontroller transmits a "Photobeam Transmission Will Cease" message to the receiving microcontroller so that the receiving microcontroller will no longer expect to receive the photobeam after transmission ends.

In the event that an object 24 moves into position between slave assembly 12 and master assembly 16 and thereby interrupts one or both of photobeams 56, 58 so that reception at one or both of corresponding receivers 82, 42 is interrupted, then the microcontroller that is no longer receiving the photobeam may transmit an alarm signal to a corresponding one of alarm relays 34, 34m. In response to receiving the alarm signal, alarm relay 34 or 34m may cause an audible siren to be activated, and/or may send a secondary alarm signal to a central monitoring station via telephone lines so that an appropriate authority, such as local police, may be dispatched to the location of arrangement 10 to investigate whether object 24 is a human intruder.

Figure 5:
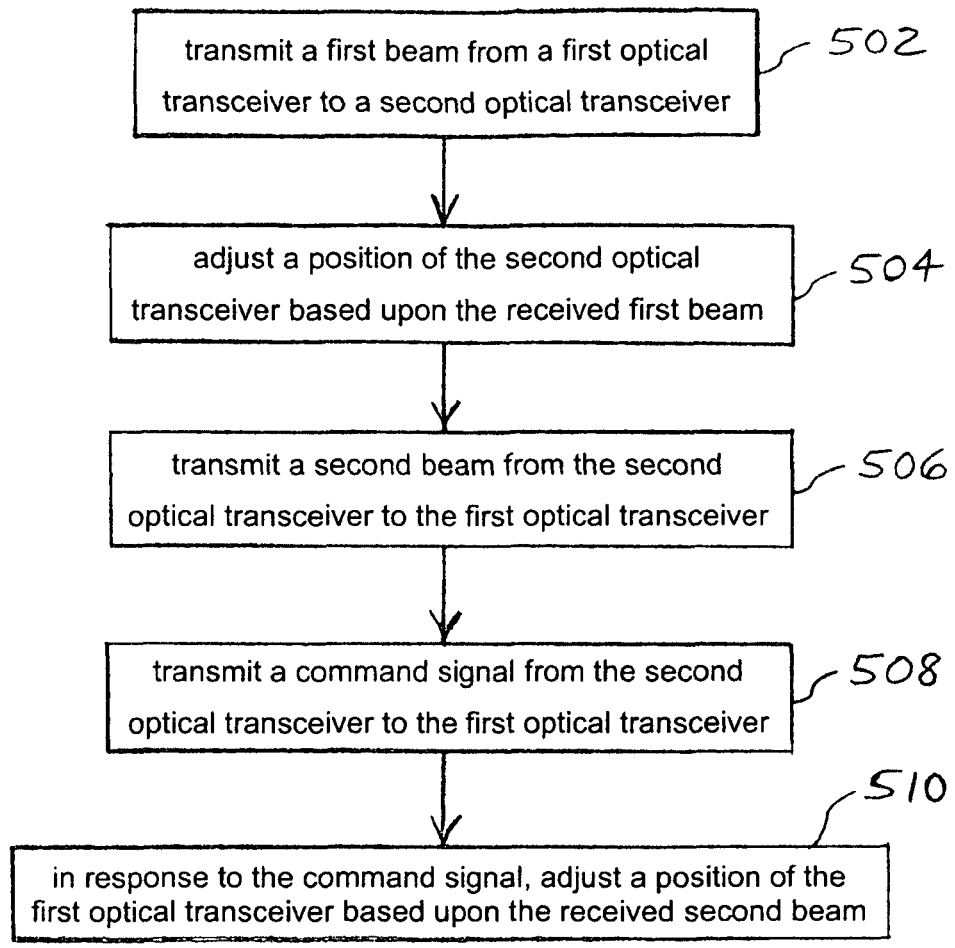
FIG. 5 is a flow chart of one embodiment of a method of the present invention for aligning an optical beam.

FIG. 5 illustrates one specific embodiment of a method 500 of the present invention for aligning an optical beam. In a first step 502, a first beam is transmitted from a first optical transceiver to a second optical transceiver. For example, photobeam 56 may be transmitted from an optical transceiver in the form of emitter 40 and receiver 42 to an optical transceiver in the form of emitter 80 and receiver 82.

In a next step 504, a position of the second optical transceiver is adjusted based upon the received first beam. That is, master microcontroller 18 may operate horizontal actuator assembly 30m and vertical actuator assembly 70m to adjust the position of master housing 38m to optimize a signal quality of photobeam 56 as received.

In step 506, a second beam is transmitted from the second optical transceiver to the first optical transceiver. For example, after master microcontroller 18 has adjusted the position of slave housing 38m, photobeam 58 is transmitted from the optical transceiver in the form of emitter 80 and receiver 82 to the optical transceiver in the form of emitter 40 and receiver 42.

In a next step 508, a command signal is transmitted from the second optical transceiver to the first optical transceiver. In one embodiment, after master microcontroller 18 has completed its alignment procedure and has begun transmitting photobeam 58, master microcontroller 18 then embeds an eight-bit "Start Adjustment Procedure" command in photobeam 58.

In a final step 510, in response to the command signal, a position of the first optical transceiver is adjusted based upon the received second beam. In a particular example, in response to receiving the "Start Adjustment Procedure" command signal embedded in photobeam 58, slave microcontroller 14 may operate horizontal actuator assembly 30 and vertical actuator assembly 70 to adjust the position of slave housing 38 to optimize a signal quality of photobeam 58 as received.

Figure 6:
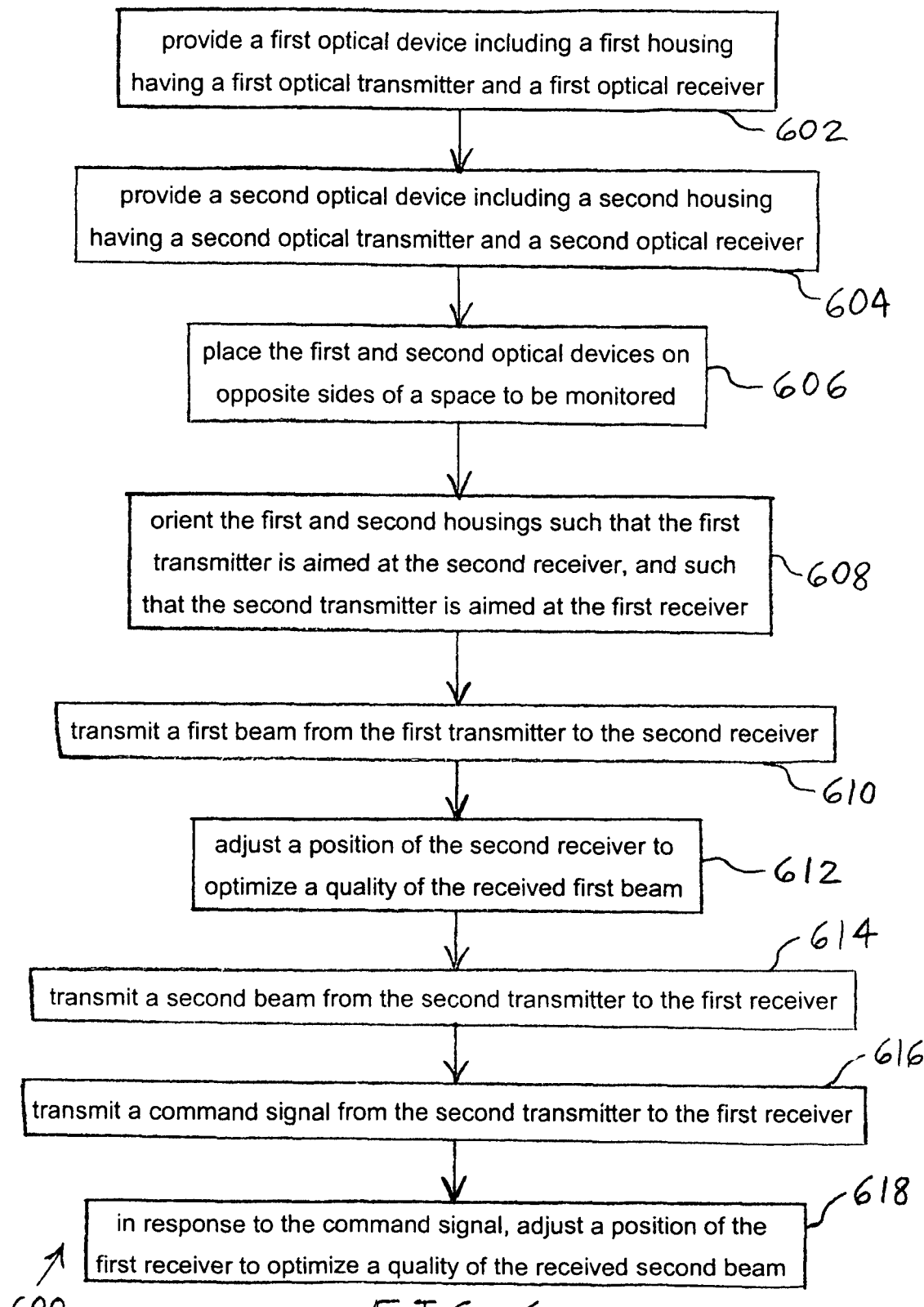
FIG. 6 is a flow chart of one embodiment of a method of the present invention for providing an aligned optical beam.

In FIG. 6, there is shown one embodiment of a method 600 of the present invention for providing an aligned optical beam. In a first step 602, a first optical device is provided including a first housing having a first optical transmitter and a first optical receiver. For example, an optical device in the form of photo-optical device 28 is provided including a housing 38 having a first optical transmitter 40 and a first optical receiver 42.

In a next step 604, a second optical device is provided including a second housing having a second optical transmitter and a second optical receiver. That is, an optical device 28m is provided including a housing 38m having an optical transmitter 80 and an optical receiver 82.

Next, in step 606, the first and second optical devices are placed on opposite sides of a space to be monitored. In a specific embodiment, optical devices 28, 28m are placed on opposite sides of a hallway 20 to be monitored.

In step 608, the first and second housings are oriented such that the first transmitter is aimed at the second receiver, and such that the second transmitter is aimed at the first receiver. That is, the installer may manually adjust the vertical and rotational positions of housings 38, 38m such that transmitters 40, 80 are each pointed in the general direction of the corresponding receiver 82, 42 in the opposite assembly.

In a next step 610, a first beam is transmitted from the first transmitter to the second receiver. For example, photobeam 56 may be transmitted from transmitter 40 to receiver 82.

Next, in step 612, a position of the second receiver is adjusted to optimize a quality of the received first beam. That is, master microcontroller 18 may operate horizontal actuator assembly 30m and vertical actuator assembly 70m to adjust the position of master housing 38m, and consequently of receiver 82, to optimize a signal quality of photobeam 56 as received.

In step 614, a second beam is transmitted from the second transmitter to the first receiver. For instance, photobeam 58 may be transmitted from transmitter 80 to receiver 42.

In a next step 616, a command signal is transmitted from the second transmitter to the first receiver. In one embodiment, master microcontroller 18 embeds an eight-bit "Start Adjustment Procedure" command in photobeam 58 as photobeam 58 is transmitted from transmitter 80 to receiver 42.

In a final step 618, in response to the command signal, a position of the first receiver is adjusted to optimize a quality of the received second beam. In a particular example, in response to receiving the "Start Adjustment Procedure" command signal embedded in photobeam 58, slave microcontroller 14 may operate horizontal actuator assembly 30 and vertical actuator assembly 70 to adjust the position of slave housing 38, and consequently of receiver 42, to optimize a signal quality of photobeam 58 as received.

Figure 7:
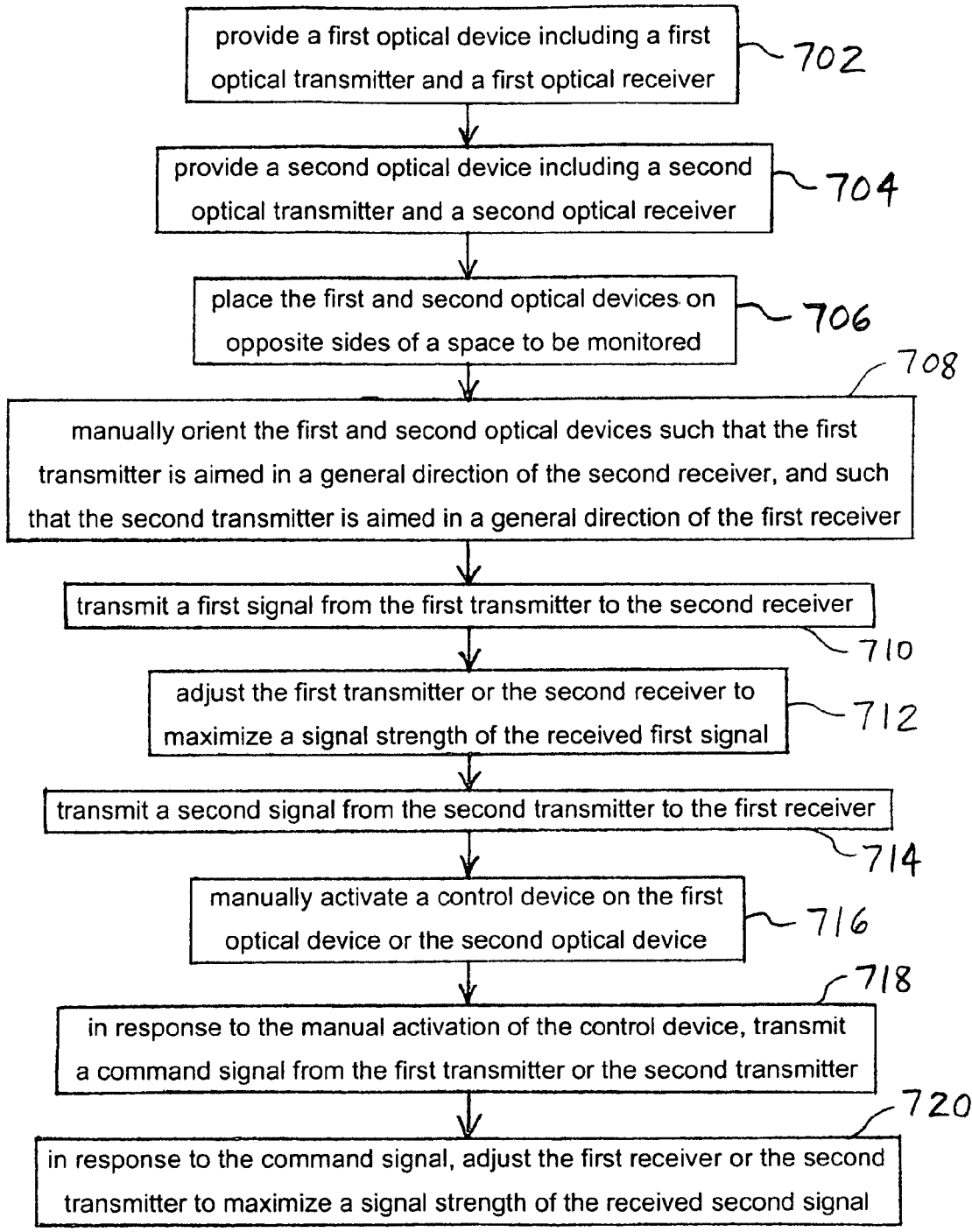
FIG. 7 is a flow chart of another embodiment of a method of the present invention for providing an aligned optical beam.

In FIG. 7, there is shown another embodiment of a method 700 of the present invention for providing an aligned optical beam. In a first step 702, a first optical device is provided including a first optical transmitter and a first optical receiver. For example, an optical device in the form of photo-optical device 28 is provided including a first optical transmitter 40 and a first optical receiver 42.

In a next step 704, a second optical device is provided including a second optical transmitter and a second optical receiver. That is, an optical device 28m is provided including an optical transmitter 80 and an optical receiver 82.

In step 706, the first and second optical devices are placed on opposite sides of a space to be monitored. In a specific embodiment, optical devices 28, 28m are placed on opposite sides of a hallway 20 to be monitored.

Next, in step 708, the first and second optical devices may be manually oriented such that the first transmitter is aimed in a general direction of the second receiver, and such that the second transmitter is aimed in a general direction of the first receiver. That is, the installer may manually adjust the vertical and rotational positions of housings 38, 38m such that transmitter 40 is aimed in the general direction of receiver 82, and transmitter 80 is aimed in the general direction of receiver 42.

In a next step 710, a first signal is transmitted from the first transmitter to the second receiver. For example, photobeam 56, such as the normal IR pulse stream illustrated in FIG. 4a, may be transmitted from transmitter 40 to receiver 82.

In step 712, the first transmitter or the second receiver is adjusted to maximize a signal strength of the received first signal. That is, a position of transmitter 40 may be adjusted by horizontal actuator assembly 30 and vertical actuator assembly 70 to maximize a signal strength of photobeam 56 as received at receiver 82. Alternatively, a position of receiver 82 may be adjusted by horizontal actuator assembly 30m and vertical actuator assembly 70m to maximize a signal strength of photobeam 56 as received at receiver 82.

Next, in step 714, a second signal is transmitted from the second transmitter to the first receiver. For example, photobeam 58, such as the normal IR pulse stream illustrated in FIG. 4a, may be transmitted from transmitter 80 to receiver 42.

In a next step 716, a control device on the first optical device or the second optical device is manually activated. That is either of pushbuttons 84, 84m may be pushed by a human installer.

In step 718, in response to the manual activation of the control device, a command signal is transmitted from the first transmitter or the second transmitter. For instance, if pushbutton 84m has been pushed, master microcontroller 18 embeds an eight-bit "Start Adjustment Procedure" command in photobeam 58 as photobeam 58 is transmitted from transmitter 80 to receiver 42. Similarly, if pushbutton 84 has been pushed, slave microcontroller 14 may embed an eight-bit "Start Adjustment Procedure" command in photobeam 56 as photobeam 56 is transmitted from transmitter 40 to receiver 82.

In a final step 720, in response to the command signal, the first receiver or the second transmitter is adjusted to maximize a signal strength of the received second signal. That is, if the command signal is received by slave microcontroller 14, then a position of receiver 42 may be adjusted by horizontal actuator assembly 30 and vertical actuator assembly 70 to maximize a signal strength of photobeam 58 as received at receiver 42. Alternatively, if the command signal is received by master microcontroller 18, then a position of transmitter 80 may be adjusted by horizontal actuator assembly 30m and vertical actuator assembly 70m to maximize a signal strength of photobeam 58 as received at receiver 42.

Slave assembly 12 and master assembly 16 have been described herein as each including a vertical gear mechanism and a horizontal gear mechanism. However, in another embodiment, the vertical gear mechanism and horizontal gear mechanism are replaced by respective screw mechanisms (not shown) for shifting the housing in horizontal and vertical directions.

While this invention has been described as having an exemplary design, the present invention may be further modified within the spirit and scope of this disclosure. This application is therefore intended to cover any variations, uses, or adaptations of the invention using its general principles.

What is claimed is:

1. A method of aligning an optical beam, comprising the steps of:
    transmitting a first beam from a first optical transceiver to a second optical transceiver;
    adjusting a position of the second optical transceiver based upon the received first beam;
    transmitting a second beam from the second optical transceiver to the first optical transceiver;
    transmitting a first command signal from the second optical transceiver to the first optical transceiver;
    in response to the first command signal, adjusting a position of the first optical transceiver based upon the received second beam; and
    transmitting a second command signal from the second optical transceiver to the first optical transceiver, the second command signal instructing the first optical transceiver to begin transmitting a normal infrared pulse stream.

2. The method of claim 1 comprising the further step of transmitting a message signal from the first optical transceiver to the second optical transceiver, the message signal informing the second optical transceiver that the transmission of the normal infrared pulse stream will cease.

3. A method of aligning an optical beam, comprising the steps of:
    transmitting a first beam from a first optical transceiver to a second optical transceiver;
    adjusting a position of the second optical transceiver based upon the received first beam;
    transmitting a second beam from the second optical transceiver to the first optical transceiver;
    transmitting a first command signal from the second optical transceiver to the first optical transceiver;
    in response to the first command signal, adjusting a position of the first optical transceiver based upon the received second beam; and
    transmitting a second command signal from the second optical transceiver to the first optical transceiver, the second command signal instructing the first optical transceiver to stop transmitting a normal infrared pulse stream.

* * * * *